United States Patent [19]

Reil et al.

[11] Patent Number: 5,251,366
[45] Date of Patent: Oct. 12, 1993

[54] APPARATUS FOR FEEDING SHEET-LIKE BLANKS TO A DEEP-DRAWING MACHINE

[75] Inventors: Wilhelm Reil, Bensheim; Udo Liebram, Pfungstadt; Manfred Wallich, Nauheim; Bernhard Korus, Darmstadt, all of Fed. Rep. of Germany

[73] Assignee: Tetra Alfa Holdings S.A., Pully, Switzerland

[21] Appl. No.: 932,780

[22] Filed: Aug. 20, 1992

[30] Foreign Application Priority Data

Aug. 22, 1991 [DE] Fed. Rep. of Germany ....... 4127854

[51] Int. Cl.$^5$ .............................................. B29C 31/04
[52] U.S. Cl. ...................................... 29/33 Q; 271/99; 493/76; 493/85; 493/379; 425/385; 425/387.1; 425/397
[58] Field of Search ................. 53/453, 452, 559, 571; 493/67, 74, 76, 85, 123, 133, 211, 344, 379; 425/385, 387.1, 394, 397, 403.1; 264/545; 29/33 Q; 271/99; 83/191, 194

[56] References Cited

U.S. PATENT DOCUMENTS

| | | | |
|---|---|---|---|
| 3,837,782 | 9/1974 | Meissner et al. | 425/387.1 |
| 4,680,023 | 7/1987 | Varano | 493/74 |
| 4,804,322 | 2/1989 | Turtschan | 425/397 |
| 5,062,340 | 11/1991 | Greyen | 493/344 |

FOREIGN PATENT DOCUMENTS

| | | |
|---|---|---|
| 2952435 | 12/1979 | Fed. Rep. of Germany . |
| 4005972 | 2/1990 | Fed. Rep. of Germany . |
| 1160779 | 8/1969 | United Kingdom . |
| 2134033 | 8/1984 | United Kingdom . |

*Primary Examiner*—Mark Rosenbaum
*Assistant Examiner*—Kenneth J. Hansen
*Attorney, Agent, or Firm*—James F. Mudd; Mark G. Bloom; Michael L. Dunn

[57] ABSTRACT

An apparatus for feeding sheet-shaped blanks (9) of deep-drawable synthetic plastic material to the receiving station of a deep-drawing machine having a plurality of suction plates (15) wherein a supply roll (2) holding a web (1) of synthetic plastic material which is capable of being intermittently driven by pairs (3, 4, 23) of drive rollers and moved in front of a cutting means (5) having on its downstream side a magazine (8), a movable flap (11) provided with suckers (33) and a first supporting plate (13) being adapted to be brought into engagement with the removal side of the magazine (8), a second movable supporting plate (16) provided with suckers (33) being disposed on the other side, guide means (35) being provided in order to feed the blanks (9) from the movable flap (11) and round onto the opposite side of the suction plate (15) to the second supporting plate (16).

11 Claims, 5 Drawing Sheets

APPARATUS FOR FEEDING SHEET-LIKE BLANKS TO A DEEP-DRAWING MACHINE

BACKGROUND OF THE INVENTION

The invention relates to an apparatus for feeding sheet-like blanks of deep-drawable synthetic plastic material to the receiving station of a deep-drawing machine having at least one heatable suction plate. Numerous methods and apparatuses for the manufacture of packagings for flowable media are known, one particular method relating to the manufacture of a packaging which is filled with a flowable medium, e.g., a packaging filled with milk or juice. This packaging element consists of a tube with a bottom and a top wall, all parts being formed from workable synthetic plastic material, preferably by means of a deep-drawing machine. In this respect, it is known that two blanks, each in the form of a flat sheet, are taken from a magazine and fed to one of a plurality of heatable suction plates. Therefore, the heatable suction plate has a separate blank applied to each of its two sides so that the two blanks bear on this suction plate and are heated at a distance from each other.

The further procedural steps in the deep drawing machine, particularly the stepwise heating by contact with a plurality of heatable suction plates, are of no interest where the present invention is concerned, and therefore they will not be described here.

The invention relates to the feeding of the blanks to the heatable suction plate and improvements made to the apparatuses used in this field.

Where the above-described prior art methods are concerned, two magazines to hold the already singled-out blanks are provided on opposite sides of the heatable suction plate or plurality of heatable suction plates. It has been found that it is difficult to bundle sheet-like blanks in large quantities, and furthermore this requires repackaging materials which should be avoided as far as possible. It is known that packaging elements are printed and if already an at least partial print has been applied to the individual blanks, then there is a danger that the print will be wrongly aligned or may even be the wrong way round. During in-house use of the previous manufacturing process, one person was constantly busy loading the deep-drawing machine. This and other handling operations for correctly guiding the blanks from the magazine to the heatable suction plates gave rise to hygiene problems, apart from the higher costs incurred by the handling operations carried out by the aforementioned person until such time as the blanks were singled out.

A man skilled in the art was aware that by producing the deep-drawn package from two shell halves for which one blank had to be fed to each side of the relevant heatable suction plate, it was also necessary to have on each side a magazine to hold blanks and provided with all the mechanical conveying means. Instead of using singled-out blanks, it should have been obvious to work from one web, in which case on each side of the respective heatable suction plate, it would have been necessary to feed a supply roll and a web of deep-drawable synthetic plastic material. Not only would the extra expense of such an installation be considerable but also the risk of the position of the printed part on the then cut off blank being switched round would not have been overcome. Furthermore, the aim of the contractor is to achieve a long effective life of the package producing machine without any interruption in operation for the feeding of raw material. Where supply rolls are concerned, however, the man skilled in the art has no opportunity for continuous conduct of operation without any down time required for roll changing.

Therefore, the invention is based on the problem of so developing an apparatus having the features mentioned at the outset that despite an increase in machine output, production is simplified and operation becomes more able to meet the exacting demands of hygiene.

This problem at least partially entails overcoming the specifically mentioned drawbacks of the prior art devices and of the apparatuses already developed.

SUMMARY OF THE INVENTION

According to the invention, the problem is resolved in that a supply roll holding a web of deep-drawable synthetic plastic material is provided and can via pairs of drive rollers be intermittently driven in front of a cutting means having a magazine on the downstream side. A movable flap provided with suckers and also a first supporting plate are adapted to be brought into engagement with the take-off side of the magazine. A second movable supporting plate provided with suckers is disposed opposite the first supporting plate, on the other side, in relation to the heatable suction plate. Guide means are provided, comprising a conveyer for passing the blanks round from the movable flap onto the opposite side of the heatable suction plate and to the second supporting plate. The inventors tried an arrangement in which from only one supply roll was drawn a synthetic plastic web which was divided into blanks which were then alternately fed to one and shortly after to the other side of at least one heatable suction plate on the deep-drawing machine so that just prior to conclusion of the feeding movement the uppermost heatable suction plate, where there are a plurality of suction plates disposed one under another, can have each of its two oppositely disposed surfaces loaded with a respective blank. Thus, the total cost of the apparatus is halved because only one set of feed means need be provided to convey material from the supply roll to the cutting means. Furthermore, production is surprisingly simplified in that it is possible to work with one moving web from a supply roll. In view of these considerations according to the invention, the further advantage is enjoyed that the synthetic plastic web can be appropriately printed and there is no longer any possibility of the printed parts becoming confused, because the machine always performs the same movements and alternately and constantly feeds first one and then the other side of the heatable suction plate. By the avoidance of manual work and a plurality of handling operations, compared with the feeding of already pre-cut blanks, it is also possible for the arrangement according to the invention to satisfy the hygiene requirements in a substantially more satisfactory fashion.

DETAILED DESCRIPTION OF THE INVENTION

The deep-drawable synthetic plastic-material for the sheet-like blanks and thus for the packaging element which can be produced on the deep-drawing machine may be a thermoplastic material, e.g., polypropene. Polypropene is also widely known in the industry as polypropylene. Also PVC can serve as such a synthetic plastic material. The packaging element which can be produced by the apparatus according to the invention then consists of perfectly recyclable and easily degradable parts and materials (in contrast to composite paper/plastic materials). In the case of a particularly preferred embodiment, the synthetic plastic material, e.g., the polypropene, may also have a filler, possible fillers being chalk, mica, talcum, gypsum or the like. In practice, filler levels of up to 70%, preferably 60%, have been shown to be favorable. It has been found that such filled synthetic plastic materials are on the one hand degradable but can naturally also be reworked or recycled easily and by simple methods, while not adversely affecting the properties of a plastic material, so that such filled synthetic plastic materials are in particular adapted to deep-drawing and also sealing.

From the supply roll, the synthetic plastic web is pulled or pushed into a cutting apparatus in which the web is cut cross-wise to its direction of conveyance, thus producing consecutive sheet-like blanks. These blanks are not supplied directly to the suction plate by guides but according to the invention, there is on the downstream side a magazine in which the individual blanks can be stacked in specific quantities as if in a buffer zone. The purpose of this magazine resides mainly in the equalizing of the supply in which case, then, the web conveyance may, to a certain extent, be interrupted. By reason of this measure, surprisingly, roll changing can be carried out without any effect on the operation of the deep-drawing machine so that the long running time of the deep-drawing machine which is so highly valued by the contractor is guaranteed. When the magazine is filled, if it is necessary to change the roll, then the feed of web can be shut down, the empty core from the previous supply roll can be exchanged for a full core with the new supply roll of synthetic plastic web and the two web ends (end of the first and start of the second rolls) can be joined. Generally, as with the cutting and splicing of films, this joint is preferably made by the application of an adhesive strip such as for example a strip of Tesa ®, a trademark of Belersdorf Company. It will be appreciated that the synthetic plastic web will have to be stopped for ten minutes, for example, for these jobs to be performed. The said magazine can according to the invention be so designed that it is able to supply the suction plate with the required blanks for ten minutes, for example, until it has run out but then the web can be switched on again and continued to be conveyed. The machined on the suction plate side therefore suffers no disadvantages of any kind due to the roll change with the jobs this entails, because it "notices" nothing.

The magazine has an input side which is associated with the cutting device and into which the latter delivers the singled-out blanks. These blanks fall in for instance in a vertical disposition. On the outlet side, the singled-out blanks are removed. At the outlet, for example, the bottom end, of the magazine, the bottom blank rests on supporting edges over which it can be removed for instance by suction means. According to the invention, a flap provided with suckers is adapted for movement so that it can take blanks from the magazine and place them into a guide arrangement.

Every second blank is picked up by the suckers of a first supporting plate. While the first supporting plate is able to deliver the attracted blank directly to the heatable suction plate one it has approached this latter, the first blank which was picked up by the flap with the suckers and fed into the guide means, has to be conveyed by this guide means onto the other side of the heatable suction plate. Thus, there is a second supporting plate in a state of readiness and it is capable of gripping the blank which has arrived at the extreme position of the guide means and of likewise applying it to the heatable suction plate, but on the side which is opposite the first supporting plate. Therefore, by means of the guide arrangement, supporting plates on both sides of the heatable suction plate can be supplied with blanks from one and the same location, namely the outlet side of the magazine.

This construction simplifies production from a deep-drawing machine and nevertheless the machine is able to produce a large quantity of packaging elements per minute. Handling operations by staff are substantially eliminated so that also hygiene requirements are met more satisfactorily.

According to the invention, it is furthermore advantageous if the magazine is of funnel-shaped cross-section and has on two adjacent sides guide walls for precise application of the blanks and if it preferably has a riddling device and if there is preferably a pivotable flap for the ejection of singled-out blanks. The blanks must be drawn off as accurately as possible and this is achieved in a very simple way by the afore-mentioned measures. If, according to the invention, gravity is used in the magazine so that the intake side for the blanks is at the top while the outlet side is at the bottom, then purely by providing sloping magazine walls in the form of an angular funnel, a guiding of the blanks is achieved particularly if the main axis of the funnel is inclined and if the blanks are allowed to run onto two adjacent side walls disposed for example at an angle of 90° to each other. Should this accurate falling and sliding along the guide walls still not be sufficient for precise application in the case of special synthetic plastic blanks, then a riddling device can overcome any friction and ensure the desired accurate application.

During a roll change, the last end of the first web is connected to the leading end of the second web, for example by adhesion or by the application of an adhesive strip. Naturally, a blank provided with such an adhesion location cannot be used for deep-drawing of the packaging elements which are to be produced. Therefore, the apparatus according to the invention is intended preferably to remove this blank which is unusable for deep-drawing, prior to the deep-drawing process. Also this improvement in production is, according to the invention, mainly possible by means of the pivoting flap which is controllable and provided on the magazine. The pivoting axis of the pivoting flap is disposed on the side opposite the side on which the singled-out blanks are supplied. In this way, with appropriate and controlled actuation, the blank which has the adhesive joint is able to run onto the turned-down pivoting flap. It can at that moment be ejected sideways by the flap when the next now usable blank is fed out of the cutting device and into the magazine.

According to the invention, it is furthermore advantageous if the flap provided with suckers and situated on the under side of the magazine is adapted to pivot about a horizontal shaft until it reaches a position parallel with the intake surface of the guide means. The sheet-like blank which is taken from the under side of the magazine or from its delivery side by the guide means can be conveyed preferably in a vertical position. In this way, the blank is expediently removed from the under side of the magazine in a substantially horizontal position and is conveyed to the guide means in a substantially vertical position, if this vertical position is the desired position parallel with the intake surface of the guide means. In this case, the flap can be pivoted about the aforesaid horizontal shaft, which results in a particularly simple design of the apparatus according to the invention.

According to the invention, it is also favorable if the first supporting plate with suckers can be pivoted about a horizontal axis from a removable position on the under side of the magazine into a delivery position alongside the heatable suction plate and if it is adapted for a translatory movement in relation to the horizontal axis. Such a supporting plate suspension permits of simple construction because, for example, a pneumatic cylinder holds the supporting plate through a piston rod so providing for the translatory movement. On the other hand, it is also pivotable about the aforesaid horizontal axis, so that the first supporting plate is thus capable of movement both arcuately and also rectilinearly. The horizontal axis for the first supporting plate or for the pneumatic cylinder supporting it, can at the same time be separate from the horizontal shaft of the above-described flap. Thus, a high production output can be achieved because after the movable flap has been swung out from the under side of the magazine, it is already possible for the first supporting plate to be pivoted up to the under side, so that one blank after another can be taken from the removal position of the magazine.

It has already been explained above that the second supporting plate is provided for movement on the side opposite the heatable suction plate. If, then, according to the invention, there is provision for this second supporting plate to be capable of a translatory movement from a receiving position into a delivery position, then this also achieves a comparatively simple construction with a high rate of output. If, in fact, the sheet-like blank has arrived by means of the guide arrangement on the other side which could, for example, also be referred to as the second side, then by reason of its translatory mobility, the second supporting plate is able to be connected with the blank moving this with a translatory action until it reaches the surface of the heatable supporting plate. While the second supporting plate is approaching the blank from the second side, it is possible at the same time for the first supporting plate to move the other blank onto the first side, resulting in simultaneous application of blanks to both sides of the heatable suction plate.

In an advantageous further development of the invention, the guide means is of U-shaped pattern (in plan view). An inlet surface on one side of the heatable suction plate and a final surface on its opposite side form the arms of the U. If the aforementioned plan view is taken in a vertical direction and downwardly and if the flat inlet surface of the guide means is vertical, then the blank which is to be transported appears as a line and its path can be described as linear, i.e., along the line of a U. Therefore, the guide means must be so provided that it has a U-shaped transport path inside which or in the body of the U, the heatable suction plate is accommodated with the result that by virtue of this U-shaped path, the blank can be moved from one side of a suction plate to its oppositely disposed second side. While this movement is happening, the movable flap provided with the suckers conveys the relevant blanks to the intake side of the U-shaped transport path which may be a vertically disposed and flat surface. From there, suitable means provide for conveyance of the blank along the U-shaped transport path to the opposite end face which should be parallel with the intake surface and which should preferably be like-wise flat and parallel.

According to the invention, for such a development of the U-shaped transport path which engages around the suction plate, it is particularly expedient if, when viewed in plan, the guide means comprises, spanning a square and rotatable about vertical axes, four jockey and/or driving wheels for an endless conveyer and two further jockey wheels which give the transport path its U shape. These two last-mentioned jockey wheels ought then to be disposed within the square. Thus, there is for practical purposes an overall U-shaped conveyer. At the open end of the U, there is access to the heatable suction plate while on the opposite closed side of the U-shaped transport path the blanks are passed around in the desired manner. Such a guide arrangement is easily constructed and is reliable in operation.

According to the invention, it is furthermore advantageous if the guide means has guide rails which support the longitudinal edges of the blanks and which extend parallel with and at a distance from each other. Viewed in cross-section and in the direction of conveyance of the blanks, these guide rails which are preferably of synthetic plastic material or a metal may be V-shaped. The longitudinal edges of the blanks rest in the bottom of the V. The open ends are opposite each other. Preferably, one guide rail is provided at the top and another at the bottom so that the V of the bottom guide rail is normally positioned, while the V of the upper and oppositely disposed guide rail is inverted.

It is furthermore expedient to provide between the storage roll and the cutting device a stamping device by means of which irregular corners on the edges of the blanks can be removed, so that the outer edges of the ready-stamped and finally also cut blanks form the outer edges of the deep-drawn package. No further secondary treatment is required then, which in turn simplifies production.

It is also known for a plurality of packaging elements to be formed from a single pair of oppositely disposed blanks, so that the stamping device can then stamp out all the corners of all the packaging elements on one blank.

According to the invention, it is also advantageous to provide between the storage roll and the cutting device a gluing device for joining the synthetic plastic webs when the rolls are changed. The gluing process has already been explained hereinabove. The disposition of the gluing device is particularly favorable by reason of the latter mentioned measures and above all sufficient space is available in this part of the apparatus for strips of adhesive film to be stored and supplied, for adjustment processes to be carried out, and so on.

BRIEF DESCRIPTION OF THE DRAWINGS

Further advantages, features and possible applications of the present invention will emerge from the ensuing description, in conjunction with the drawings, in which.

DETAILED DESCRIPTION OF THE DRAWINGS

Figure 1:
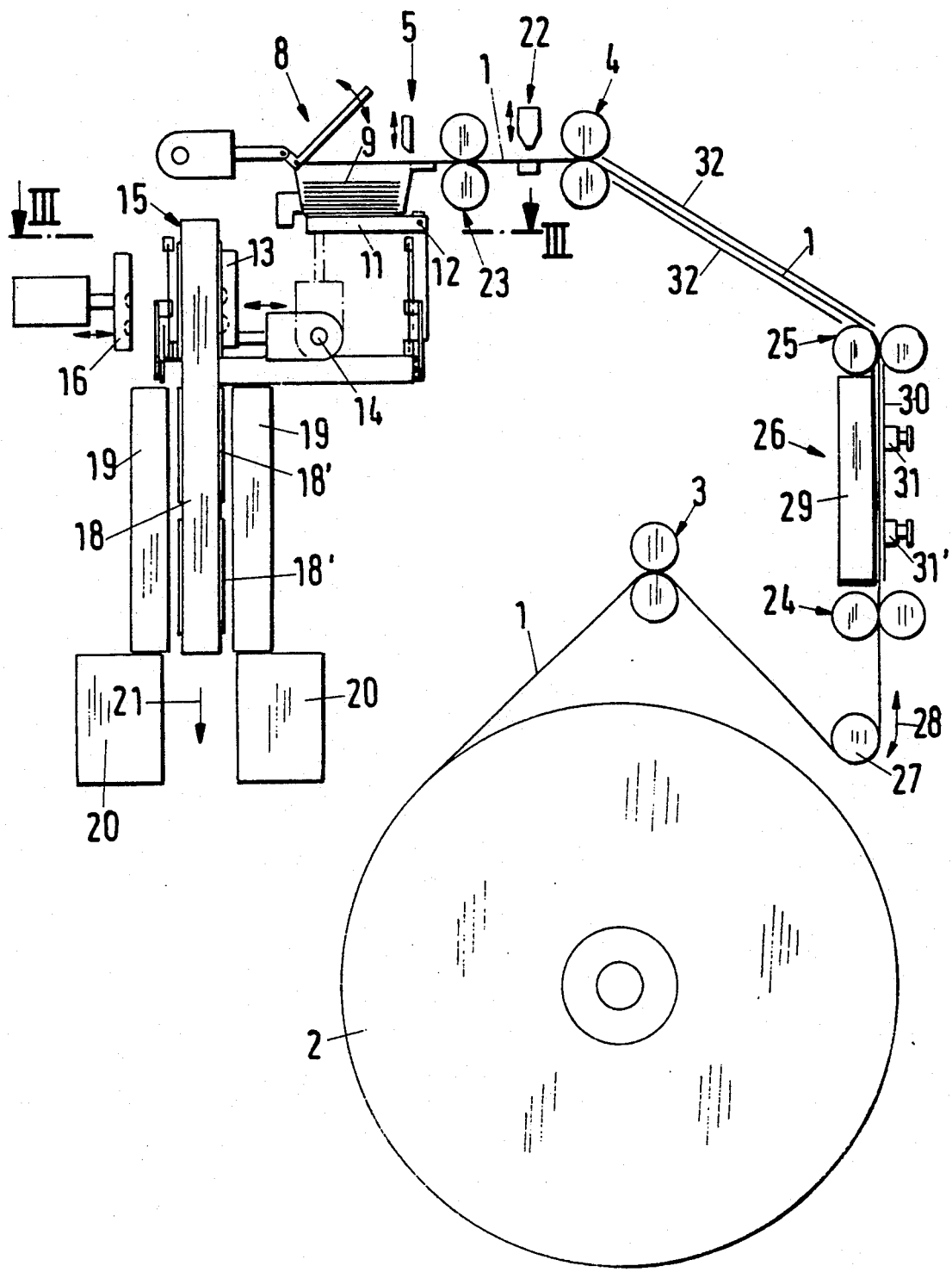
FIG. 1 diagrammatically shows an overall view of the apparatus with a storage roll and parts of the deep-drawing machine.

The overall construction of the apparatus is best seen in the cross-sectional view in FIG. 1, in which the synthetic plastic web 1 is being drawn off the storage roll 2 over a first pair of rollers 3 and on the down-stream side a second pair of rollers 4, and being fed to the cutting device 5 with a movable top blade 6 and a stationary bottom blade 7, after which it is passed into the magazine 8. The drawing shows the singled-out blanks 9 which lie in the funnel 10 of the magazine 8 and which can be introduced from above and removed from below.

Removal of the blanks 9 occurs at the bottom or removal side of the magazine 8 on the one hand via the movable flap 11 which is pivotable about the horizontal shaft 12 and on the other via the first supporting plate 13 which is pivotable about the horizontal axis 14.

Figure 2:
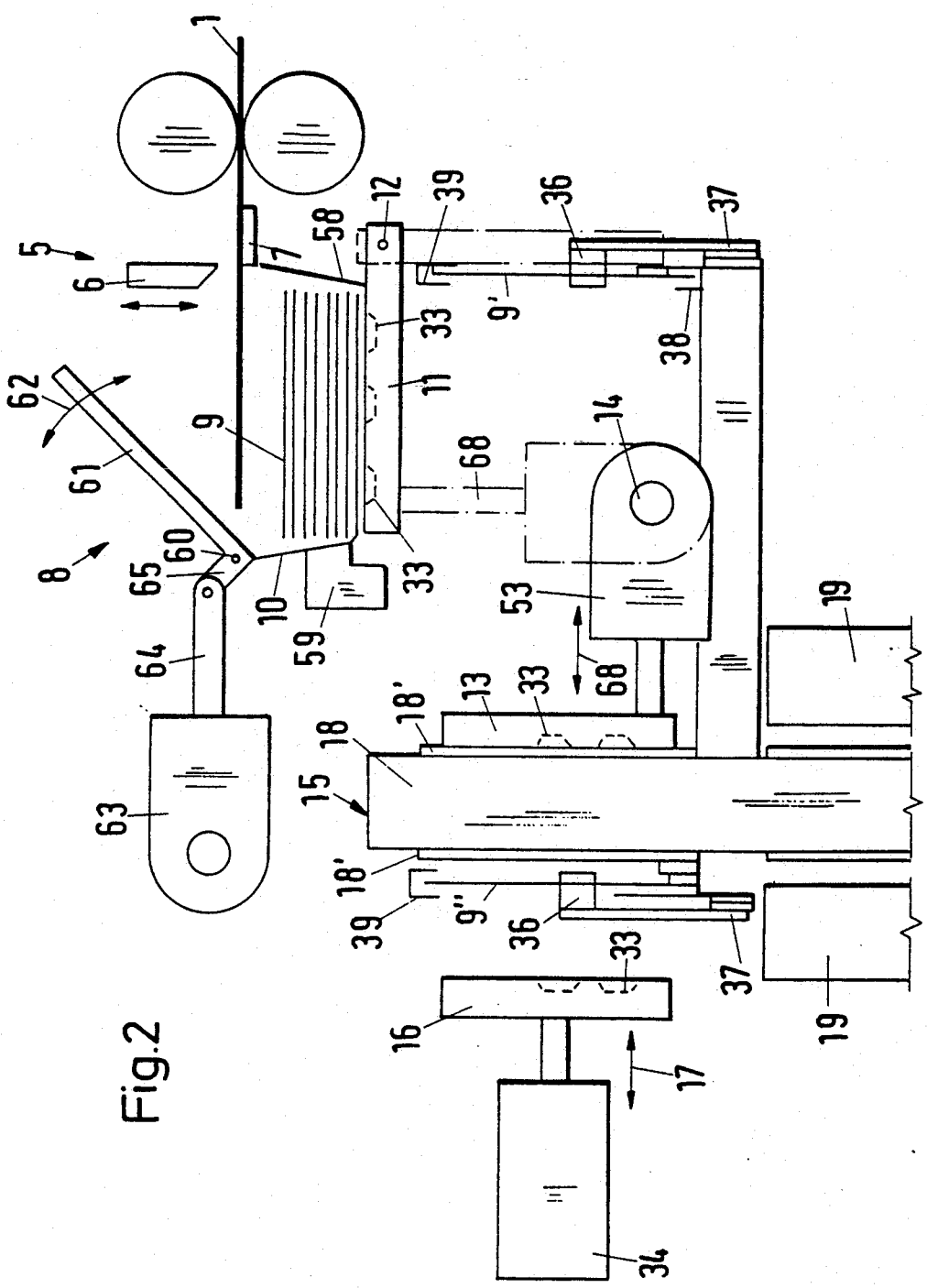
FIG. 2 is a broken-away and enlarged view of that part of the machine which is important to the invention, comprising the cutting device, the magazine, the movable flap and the first and second supporting plates.

In FIGS. 1 and 2, the movable flap 11 and the first supporting plate 13 are disposed on the right-hand so-called first side of the heatable suction plate 15, while the second movable supporting plate 16 is disposed on the left-hand and so-called second (oppositely disposed) side and is adapted for a translatory movement in the direction indicated by the double-headed arrow 17.

The construction of the plate which is described here only generally as a "heatable suction plate 15" is not particularly essential to the description of the embodiment which is regarded here as preferred. It could more precisely be mentioned that the suction plate 15 is actually a main carrier 18 with main suction plates 18' mounted on it. It is sufficient to establish that the suckers and heating, means not shown are disposed on both surfaces of the heatable suction plate which is generally designated 15 and which, by way of illustration, are designated 18' in FIG. 2. The main carrier 18 is a high plate comprising substantially three stages, the heating and suction means 18' repeating themselves so that the main carrier has on each of its two oppositely disposed sides in each case three of the said heating and suction plates 18'.

FIG. 1 shows particularly clearly the further construction of the deep-drawing machine which has in fact outer heating plates 19 in the bottom portion of the main carrier 18 and, farther down, heating plates 20 for the deep-drawing process which is of no interest here. Processing of the blanks in any case takes place in a downwards direction in accordance with the arrow 21 in FIG. 1.

Also worthy of note in FIG. 1 is the stamping device 22, a third pair of drive rollers 23, pairs of jockey wheels 24 and 25 upstream and downstream of a gluing station 26 and an idler roller 27 which is able to move upwardly and downwardly according to the double-headed arrow 28, in order to form a loop when the pairs of driving rollers 4, 23 intermittently pull on the synthetic plastic web 1.

The gluing device generally designated 26 is, during normal operation, inoperative while the synthetic plastic strip 1 is being pulled off the storage roll 2; instead, it works during roll changing. At this stage, the web 1 runs over a table 29 which acts as a supporting surface and on the side of the table which is opposite the web 1 there is a covering 30 with two fixing bolts 31, 31'. The fixing bolt 31 secures the web end of the preceding web 1 while the fixing bolt 31' secures the start of the next web from the new complete roll, so that the two straight-cut ends of the web are locked on the table 29 in an abutting situation and are connected to each other by a strip of adhesive, e.g. a strip of Tesa ® film.

Even such a glued joint passes through the pair of jockey rollers 25 in an upwards direction to the cutting device 5 and prior to entry, there passes between the pair of drive rollers 4 a portion of web which is screened by plates 32 to avoid dust clinging to it, and possibly also for cleaning purposes.

Transfer of the blanks 9 to the various positions will be readily understood by referring to FIG. 2. The flap 11 which is adapted for movement about the horizontal shaft comprises suckers 33 which are connected to vacuum lines, not shown, and can have a vacuum applied to them in a controlled fashion. Comparable suckers 33 are also to be found in the first supporting plate 13 which is adapted to pivot about the horizontal axis 14, and also in the second supporting plate 16 which is adapted for a translatory reciprocating movement in the direction of the double-headed arrow 17, by means of the pneumatic cylinder 34. With the aid of the suckers, it is possible to retain the blanks 9 securely on the respective flaps/plates 11, 13, 16, these parts of the apparatus then being capable of being moved into other positions together with the blanks 9.

In FIG. 2, the movable flap 11 is indicated by solid lines in the horizontal position and by dash-dotted lines in the vertical position, the latter being parallel with the likewise vertical inlet surface of the guide means generally designated 35. There happens to be vertically disposed in the latter a therefore vertically disposed blank 9', as is also shown in FIG. 4. From this vertically disposed inlet surface of the guide means 35, the blank 9' has to be conveyed to position 9'' on the opposite side in relation to the heatable suction plate 15, and this is accomplished by entraining means 36 which are moved around the suction plate 13 by an endless double-link chain which serves as a U-shaped conveyer 37. This will be explained hereinafter with reference to FIG. 3. Firstly, the lower guide rails 38 and upper guide rails 39 which can be seen in FIGS. 2 and 4, need to be mentioned, FIG. 4 showing the dash-dotted position 39' of the upper guide rail to illustrate the fact that according to the size of the blanks 9 or 9' so this upper guide rail 39 can also be displaced into its midway position of the dash-dotted guide rail 39'. A holding plate 40 connects the lower guide rail 38 to the upper guide rail 39 or holds this latter particularly in the U-shaped transport path 41 which can be seen in FIG. 3 and which is illustrated by a bracket curved into a U-shape. In the pivoting ranges of the movable flap 11 about the horizontal shaft 12 and also o the correspondingly opposite side at least the upper guide rail 39 has been removed so that movements out of or into the relevant vertical face of the guide means 35 are possible, as indicated by the dash-dotted lines 43 in FIG. 4. For further support, particularly in the rail-free portions, a fixed guide 44 is provided, as indicated in FIG. 4, and is opposite an abutment 45 for further supporting of the blank 9'. At the bottom are shown rail portions 46 for the double link chain which serves as a conveyer 37 (FIG. 4).

Figure 3:
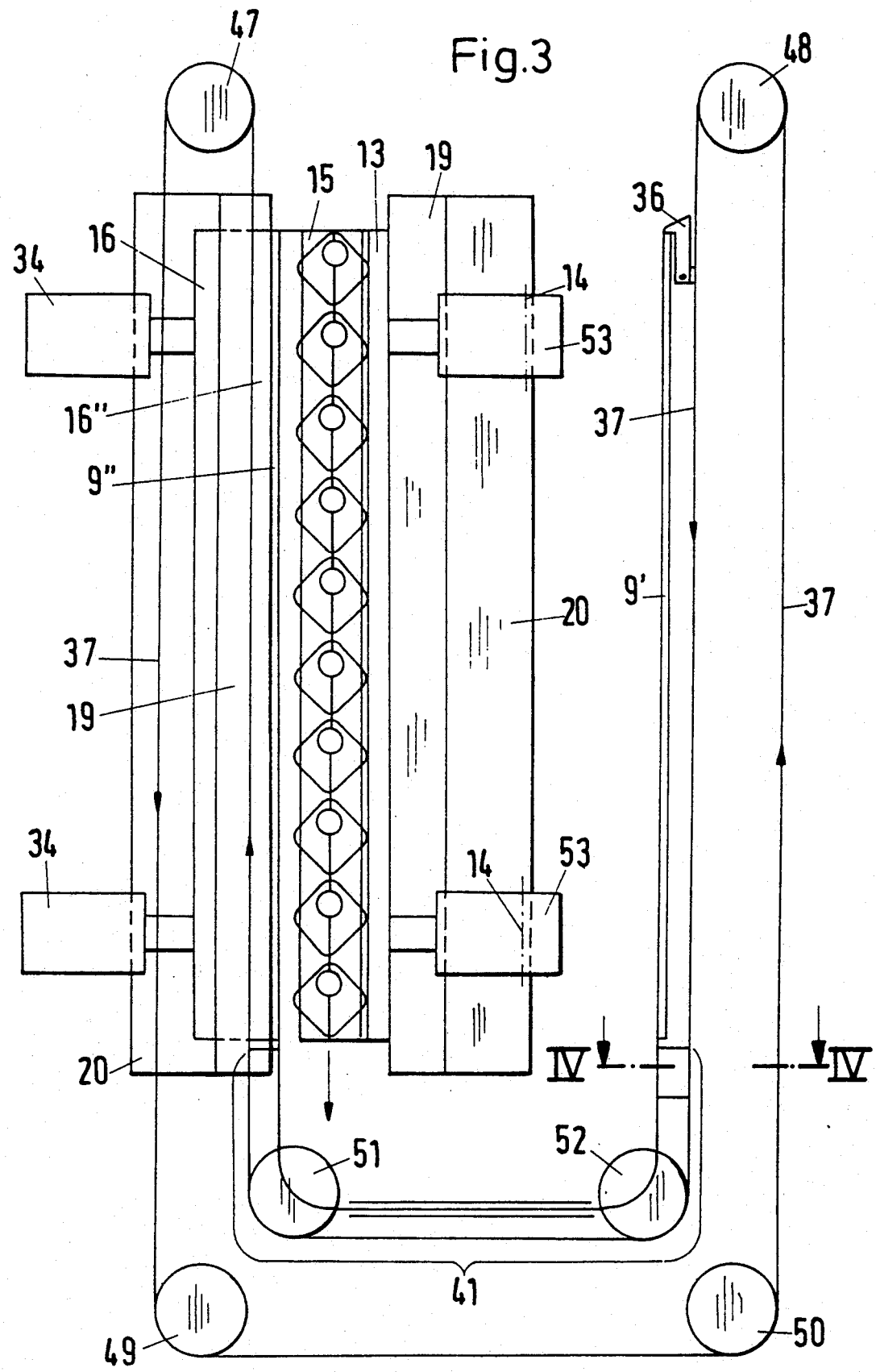
FIG. 3 is a vertical plan view of the apparatus in FIG. 1, substantially along the line III—III and shows the U-shaped guide means.
Figure 4:
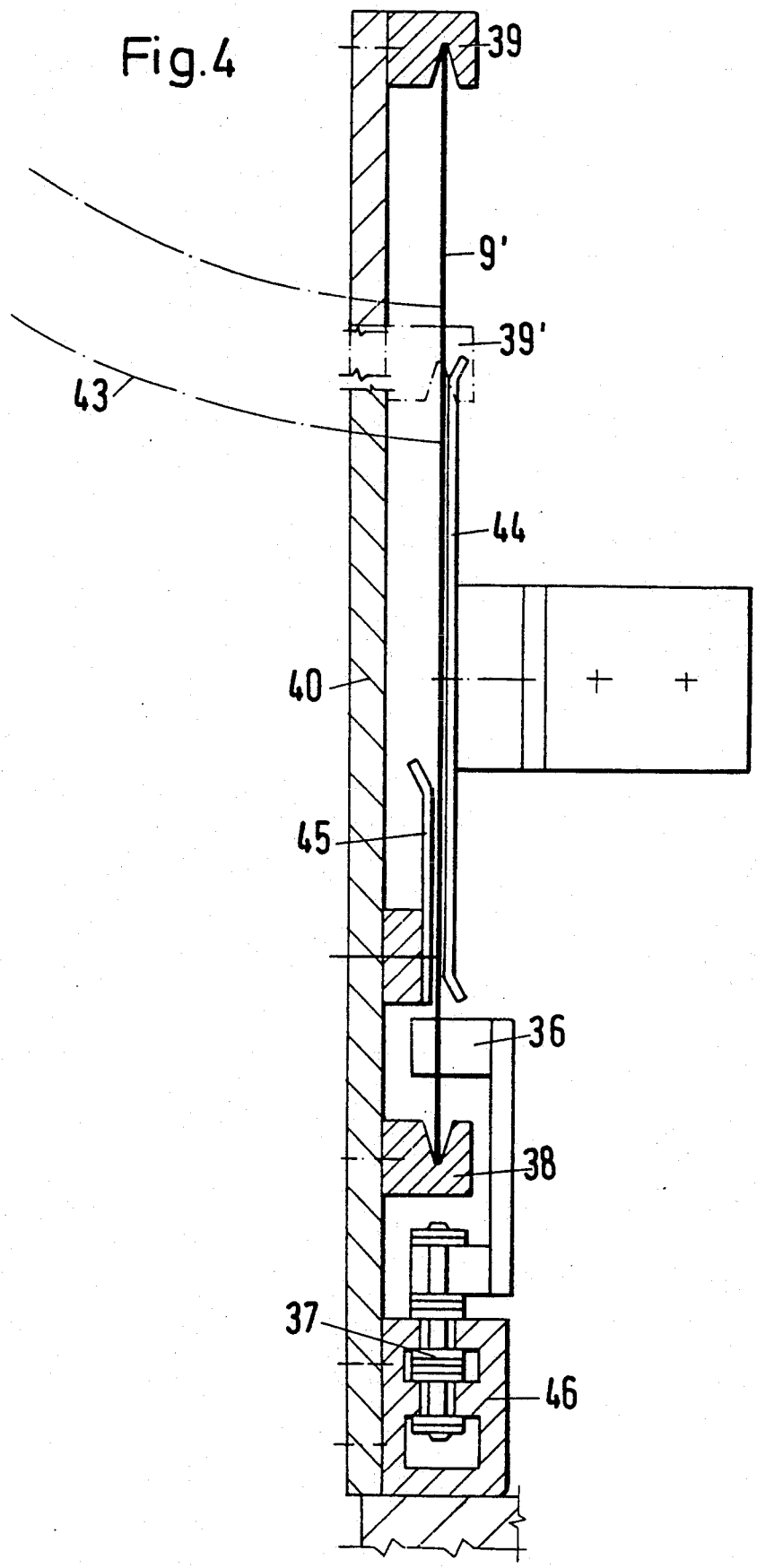
FIG. 4 is a cross-sectional view through a strand of the guide means substantially on the line IV—IV in FIG. 3.

The guide means 35 can be seen in plan view in FIG. 3. In that drawing, there are shown at the top two driving/deflecting or jockey wheels 47, 48 which together with two lover jockey wheels 49, 50 span a quadrilateral figure for the conveyer 37 (double-link chain), this endless conveyer 37 being moved in the direction of the arrows in FIG. 3. To produce the U-shape and in addition to form the U-shaped transport path 41, the free arms of which continue in a straight line to the upper driving/jockey wheels 47, 48, there are in the bottom area two further jockey wheels 51, 52. All the jockey wheels 47 to 52 are capable of rotating about vertical axes.

By virtue of the plan view in FIG. 4, the various flat surfaces of the guide means are seen as lines. On the right-hand side of FIG. 3, the blank 9' is just in the inlet surface of the guide means 35, while on the side opposite the heatable suction plate 15 the blank 9" is just in the end face of the U-shaped transport path 41 or in an extension of the arms of its U-shape. In the inlet surface and in the end surface the blanks 9' and 9" respectively are in the flat position. The blanks are however flat and capable of being bent, which is why they can also readily follow the curvatures of the U-shaped transport path 41.

In comparison with FIG. 2, FIG. 3 shows that two pneumatic cylinders 34 are disposed one above the other on the left-hand side of the suction plate 15 and that also on the opposite right-hand side there are two pneumatic cylinders 53 which are pivotable about the horizontal axis 14 and which serve to hold the first support plate 13. The pneumatic cylinders 34 secure the second support plate 16 which is shown in two different positions in FIG. 3, namely the retracted position of the second support plate, designated 16, in accordance with FIG. 2, and a right-hand position in which the second support plate is designated 16". Furthermore, in the area under the suction plate 15 are shown a row of ten packaging elements in plan view which have already been deep-drawn and connected into one piece. This row of packaging elements serves only for better illustration and to assist comprehension, whereas this row of packaging elements cannot in itself be directly observed, if one examines the cross-section III—III in FIG. 1.

By reason of the U-shaped configuration of the transport path 41, it is possible to convey the blank 9" from the inlet surface between the guide rails 38, 39, and to pass it around the jockey wheels 51, 52 so that after leaving the transport path 41, the blank is straightened, and in its straight and flat form comes to rest in the end face where the blank is designated 9"'. Both the outer heating jaws 19, and also the deep-drawing tools 20, will revolve through this U-shaped conveyer path together with the suction plate 15. In this way, it is possible by means of the guide arrangement 35 shown in FIG. 3, to transport the blanks leftwardly from the right-hand inlet face 9' shown in FIGS. 2 and 3, to the oppositely disposed end face where the blanks are designated 9"'.

Referring again to FIG. 2, and in particular to the illustration of the magazine 8. Magazine 8 has in cross-section, the form of a funnel or hopper with guide walls of which only two are diagrammatically shown as opposite each other and inclined to the vertical. In operation, the stack of blanks 9 is furthermore correspondingly inclined and must be imagined as resting on one of these guide walls 58. In addition, but not illustrated, the stack must then also rest on the adjacent guide wall in order to guarantee an accurate positioning of whichever is the bottom blank 9. A riddling or vibrating means 59 can assist in ensuring that the blanks rest on these guide walls 58.

While the bottom of the magazine 8 must also at the same time be the removal position, then, the open top must be the receiving position into which fall the blanks which have just been cut off. There, on the rear side opposite the cutting device 5 is spindle 60 about which a pivotable flap 61 is able to pivot in the direction of the curved double-headed arrow 62, driven by the pneumatic cylinder 63 which, via the piston rod 64, engages the L-shaped arm 65 of the pivotable flap 61 for rotation about the spindle 60.

Figure 5:
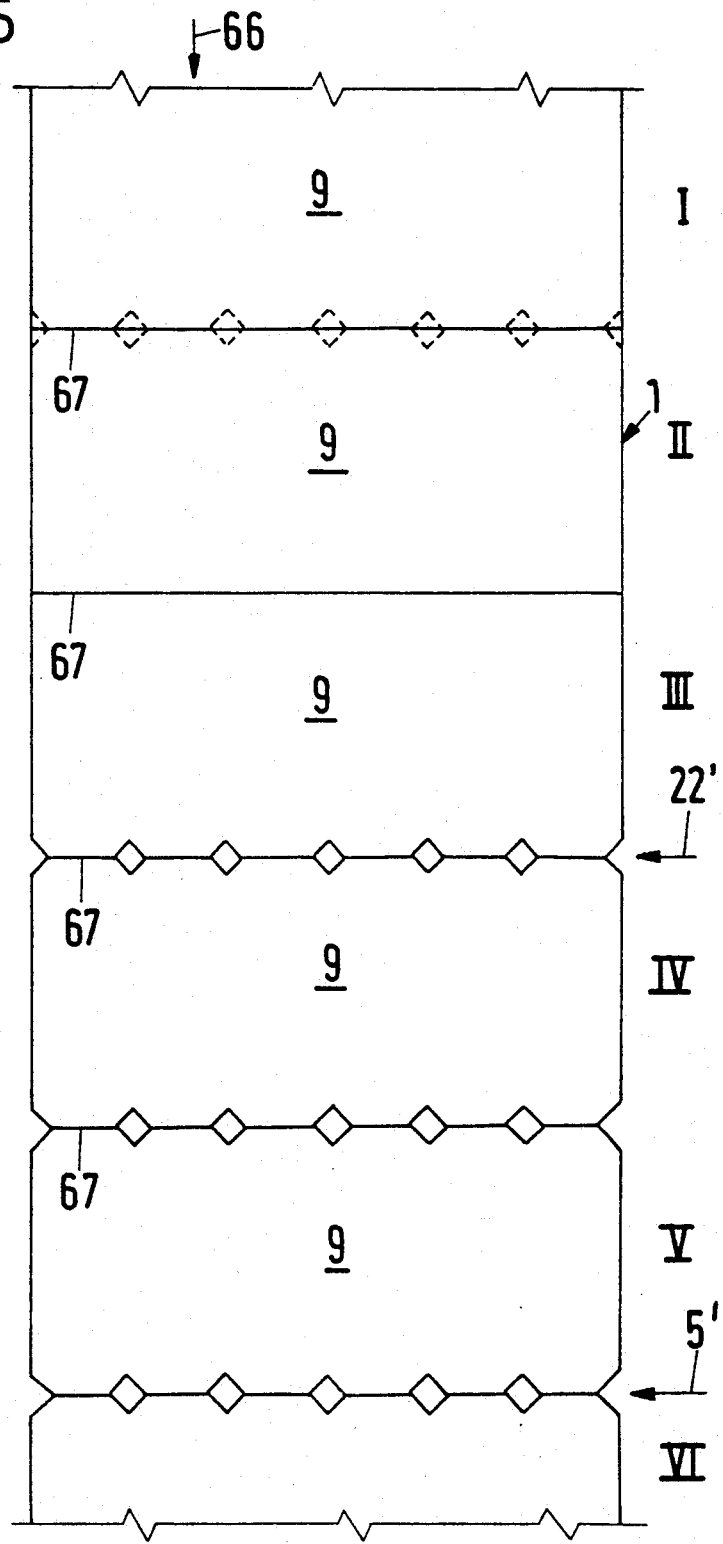
FIG. 5 is a diagrammatic broken-away view of a synthetic plastic web, showing the stamping process and the intended cutting point.

In operation, the synthetic plastic web 1 shown in FIG. 5 is transported in the direction of the arrow 66, the transverse lines 67 within the web denoting the boundaries of the individual blanks 9. For example, a row of six packaging elements can be made from the blank 9 of the web 1 shown in FIG. 5. If one takes from the web 1 an imaginary blank 9, then this passes through the positions I to VI one after another. At the boundary line 67 between the positions I and II a series of squares can be seen, shown by broken lines and which only show the position of what will subsequently be stamped cuts, no stamping process having been carried out at this stage. Instead, no cut or stamping is performed on the web either in position I or in position II, which is why the line 67 between the positions II and III is also continuous, although at this point the web is still continuing to run in one piece in the feed direction 66. At the position shown by the arrow 22', between the positions III and IV, the aforementioned stamping operation is carried out at the dividing line 67 by means of the stamping unit 22. This occurs while the web 1 is stationary, because the pairs of driving wheels 4 and/or 23 produce an intermittent feed of the synthetic plastic web 1. Upon further movement into position IV, then, the row of stamped-out recesses is at the line 67 between the positions IV and V while subsequently the next stamping operation is conducted at the position of the arrow 22'. Upon further advance in the feed direction 66, then, at the arrow 5', the cut is made centrally through the row of stamped-out recesses and the blank is isolated and separated respectively. With effect from position VI onwards, the blank exists and remains singled-out and will drop directly into the magazine 8.

Further progress of the singled-out blank 9 can be easily explained with reference to FIGS. 2 and 3. The suckers 33 on the movable flap 11, attract the bottom blank 9 by suction and, as it pivots downwards about the horizontal shaft 12, through 90°, they draw the blank from the removal side of the magazine 8 and into the inlet surface of the guide means 35, coming to rest, so to speak, in front of the entraining means 36. The flap 11 has then reached the vertical position shown by dash-dotted lines in FIG. 2. The blank which is still held by suction is shown here as 9'. This is also true for FIG. 3. If, now, the conveyer 37 cuts in intermittently, then just previously the vacuum at the suckers 33 will have been switched off, so that the blank 9' can move into the rails 38, 39 of the transport path 41. Blank 9' is pushed forward in the direction of the arrow of the conveyer 37 and arrives at the extreme position where the blank is designated 9'''. The second supporting plate 16 is now moved by the pneumatic cylinders 34 out of its waiting position rightwardly with a translatory movement in the direction of the arrow 17 as far as the blank 9''', the suckers 33 there have vacuum applied to them and by means of this second supporting plate 16, the blank 9''' can be pressed against the left-hand side of the heatable suction plate 15. There, too, suckers are provided which after they have been applied, are subjected to a vacuum whereupon the suckers 33 on the second supporting plate 16 are vented and the second supporting plate 16 is moved back to its position shown on the left in FIG. 3 (see also FIG. 2).

During this conveyance time which has just been described, the first supporting plate 13 is moved by rotation of the pneumatic cylinder 53 about the horizontal axis 14 into a position so that the first supporting plate 13 likewise reaches the horizontal position on the removal side of the magazine. The suckers 33 are switched on and by a translatory movement of the piston rod 68, as shown in FIG. 2, the bottom blank is pulled downwardly and then pivoted to the left through 90° about the axis 14; it is then moved out of this position in the direction of the double-headed arrow 69 leftwardly with a translatory movement towards the suction plate 1 against which it is applied. The vacuum at the suckers 33 of the first supporting plate 13 is switched off, vacuum is switched on at the heatable suction plate 15, and then the same pattern of movements can be repeated.

By a suitable timed control arrangement, blanks 9 can be pressed simultaneously against opposite sides of the suction plate 15 by the supporting plates 13, 16.

When the rolls are changed, the above-described gluing step takes place, the pivotable flap 61 swings downwardly as indicated by the curved double headed arrow 62 and the leading portion which contains the glued joint and which represents rejected material runs onto the pivotable flap 61, is cut off by the knife 6, whereupon the pivotable flap 61 pivots back upwardly and leftwardly and ejects the blank which incorporates the glued joint.

What is claimed is:

1. An apparatus for feeding sheet-shaped blanks (9) of deep-drawable synthetic plastic material to a receiving station of a deep-drawing machine having at least one heatable suction plate (15) having first and second sides, which comprises a supply roll (2) with a web (1) of deep-drawable synthetic plastic material; pairs (3,4,23) of drive rollers; a cutting means (5) wherein said deep-drawing synthetic plastic material is intermittently driven in front of said cutting means (5); a magazine (8) located on a downstream side of said cutting means; a movable flap (11) provided with suckers (33); a first supporting plate located on said first side of said heatable suction plate and adapted to be brought into engagement with a take-off side of the magazine (8); a second movable supporting plate (16) provided with suckers (33) which plate is disposed adjacent to said second side of which comprise a conveyer (37) for passing the blanks (9) from the movable flap (11) onto said second side of the heatable suction plate (15) to the second supporting plate (16).

2. An apparatus according to claim 1, wherein the magazine is of funnel-shaped cross section and has guide walls (58) on two adjacent sides for precise application of blanks (9) and a vibrating device (50) for a pivotable flap (61) for the ejection of individual blanks (9).

3. An apparatus according to claim 2 which also has a vibrating device (59) for a pivotable flap (61) for the ejection of individual blanks (9).

4. An apparatus according to claim 2, wherein a flap (11) provided with suckers is on an underside of a magazine (8) pivotable about a horizontal shaft (12) into a position parallel with an intake surface of a guide means.

5. An apparatus according to claim 4, wherein a first supporting plate (13) with suckers (33) can be pivoted about a horizontal axis (14) from a removable position on an underside of a magazine (8) into a delivery position alongside a heatable suction plate (15) and is adapted for translatory movement in relation to the horizontal axis (14).

6. An apparatus according to claim 5, wherein a second supporting plate (16) is adapted for translatory movement from a blank receiving position into a blank removing position.

7. An apparatus according to claim 4, wherein a guide means (35) comprises a transport path (41) which is U-shaped, an intake surface on one side of a heatable suction plate (15) and an end surface on its opposite side forming arms of said U-shape.

8. An apparatus according to claim 7, wherein a guide means (35) further comprises four jockey wheels (47 to 50) rotatable about vertical axes and which span a quadrilateral figure thereby providing an endless conveyer (37); and two further jockey wheels (51 to 52), which establish a U-shaped transport path (41).

9. An apparatus according to claim 8, wherein a guide means (35) also provides support to longitudinal edges of blanks (9), via guide rails (38, 39) which extend parallel with an at a distance from each other.

10. An apparatus according to claim 9, wherein a stamping means (22) is provided between a supply roll (2) and a cutting device (5).

11. An apparatus according to claim 10, wherein between a supply roll (2) and a cutting device (5) there is a gluing means (26) for joining synthetic plastic webs (1) when supply rolls are changed.

* * * * *